United States Patent
Wehage

[11] Patent Number: 6,164,927
[45] Date of Patent: Dec. 26, 2000

[54] PROCESS FOR VENTING A HYDRAULIC ASSISTED STEERING SYSTEM

[75] Inventor: Oliver Wehage, Hasbergen, Germany

[73] Assignees: TRW Fahrwerksysteme GmbH & Co. KG, Dusseldorf, Germany; Marzocchi Pompe S.r.l., Casalecchio di Reno, Italy

[21] Appl. No.: 09/202,167
[22] PCT Filed: Jun. 14, 1996
[86] PCT No.: PCT/EP96/02571
  § 371 Date: Jun. 30, 1999
  § 102(e) Date: Jun. 30, 1999
[87] PCT Pub. No.: WO97/47510
  PCT Pub. Date: Dec. 18, 1997
[51] Int. Cl.[7] .................................................. F04B 49/00
[52] U.S. Cl. .................... 417/307; 417/313; 417/533; 367/142; 188/72.6; 180/6.3; 180/140; 91/499; 73/49.2
[58] Field of Search ..................................... 417/313, 307, 417/53; 367/142; 188/72.6; 180/6.3, 140; 91/499; 73/49.2; 280/707; 138/30

[56] References Cited

U.S. PATENT DOCUMENTS

| | | | |
|---|---|---|---|
| 3,893,528 | 7/1975 | Rehfeld | 180/6.3 |
| 4,527,654 | 7/1985 | Shibahata et al. | 180/140 |
| 4,782,689 | 11/1988 | DeRome | 73/49.2 |
| 4,888,980 | 12/1989 | DeRome | 73/49.2 |
| 5,042,832 | 8/1991 | Takahashi et al. | 280/707 |
| 5,081,908 | 1/1992 | McBeth et al. | 91/499 |
| 5,360,322 | 11/1994 | Henein et al. | 417/313 |
| 5,407,033 | 4/1995 | Weiler et al. | 188/72.6 |
| 5,508,975 | 4/1996 | Walter | 367/142 |
| 5,769,608 | 6/1998 | Seale | 417/53 |
| 6,085,792 | 7/2000 | Cooper et al. | 138/30 |

FOREIGN PATENT DOCUMENTS

| | | |
|---|---|---|
| 1901776 | 8/1970 | Germany. |
| 2406565 | 8/1975 | Germany. |
| 3538678 | 5/1987 | Germany. |
| 4040003 | 1/1992 | Germany. |
| 4120665 | 12/1992 | Germany. |
| 4326580 | 2/1995 | Germany. |

*Primary Examiner*—Charles G. Freay
*Assistant Examiner*—Steven Brown
*Attorney, Agent, or Firm*—Tarolli, Sundheim, Covell, Tummino & Szabo L.L.P.

[57] ABSTRACT

In order to reduce the amount of air trapped in hydraulic assisted steering systems (1), a communication (13, 14) is established between the area of the oil expanding volume (8, 10, 11), which is the top area in the mounted position, and an open system (2), for example a tank volume.

2 Claims, 1 Drawing Sheet

PROCESS FOR VENTING A HYDRAULIC ASSISTED STEERING SYSTEM

The present invention relates to a method for deaerating hydraulic power-assisted steering systems with oil expansion volumes.

Generic-type power-assisted steering systems are known in prior art, whereby a power steering pump supplies a pressure medium, typically hydraulic oil, via a servo steering valve to the chambers of a hydraulic steering gear. It is known on the one hand that so-called air accumulations occur in hydraulic systems, which can result in undesirable and partly unpleasant steering results. On the other hand, so-called oil expansion volumes are created in hydraulic systems, for example, if resonators are used. Air may develop in different ways, for example, through leaks, elimination from the pressure medium, and the like. Particularly if the oil expansion volumes, e.g., the resonator, have a dome in which air may collect because the dome points upward in mounted position, a corresponding amount of air will accumulate over time within the dome and cause significant interference due to foaming and will consequently increase pump wear.

There is thus a need to take measures to reduce the enclosed air quantities.

Based thereon, it is the object of the invention to define a method for reducing air pockets. A further object of the invention is to define a hydraulic power-assisted steering system with reduced air constituents that will not have the disadvantages caused by air pockets.

For the technical solution to this problem, the invention defines a method for deaerating hydraulic power-assisted steering systems with oil expansion volumes, whereby the upper volume area as seen in mounted condition is connected with a tank volume.

To solve this technical problem, the invention proposes a hydraulic power-assisted steering system with at least one oil expansion volume in the form of a resonator arranged on a hydraulic pump. The top area of this resonator in mounted position has a connection to a tank volume provided by a valve that projects directly into the tank and is used simultaneously as a deaeration and feeding valve.

This technical solution according to the invention makes it possible to remove the air accumulating within the dome to an open system. This open system is realized by a tank volume. Other embodiments are feasible and fall within the scope of the invention. For this purpose, the invention provides that the connection between the two volumes advantageously depends on operating parameters. A suitable operating parameter is the hydraulic pressure.

Thus, at a given hydraulic pressure, a connection is established such that the air accumulated in an expansion volume can be removed to an open system. The invention advantageously proposes to use a connection line. Particularly advantageously, this connection line is realized by a valve or is provided with a valve.

The invention provides a simple, low-cost method to prevent to a large extent the formation of air pockets.

Applying the method according to the invention to a hydraulic power-assisted steering system results in a novel power-assisted steering system with an oil expansion volume, the top area of which, as seen in mounted condition, is provided with a connection to an open system, preferably a tank volume.

The invention may be applied with particular advantage to a hydraulic power-assisted steering system with integrated resonator.

Particular advantages result in steering systems, in which a resonator is arranged directly on the hydraulic pump. The resonator is a volume element with a plurality of chambers, whereby the pressure pulsation of the hydraulic oil is reduced in the resonator. It is known to arrange such a resonator directly in an upper area of the hydraulic pump. A tank, typically a plastic component, surrounds both a part of the pump and the resonator.

Particularly advantageously, a valve is disposed in the upper area of the resonator or of an expansion volume. According to a particularly advantageous proposal of the invention, this valve opens as a function of pressure.

According to an advantageous proposal of the invention, this valve, which opens and closes as a function of pressure, projects directly into the tank. Thus, any air accumulating over time within the resonator is regularly removed to an open system, i.e., the tank, as a function of the hydraulic pressure.

A particularly advantageous proposal of the invention provides that the novel valve for releasing the collected air according to the invention replace an existing valve with an originally different function, which is provided on a hydraulic pump.

In a hydraulic system, air may collect in various ways. It may accumulate as a pump is filled or as the system is refilled during operation. It is also known that air may develop in a hydraulic system through cavitation, chemical decomposition, leakage, and the like. The ordinary oil volume flow will not remove this air from the system. Instead, the air collects in the upper volume areas, e.g., in a resonator lid. This occurs particularly if the resonator lid is dome-shaped. The air remaining in the system foams the oil being delivered. This deteriorates the noise behavior and may cause the lubricating film in the pump to tear off and thus can reduce the life of the pump.

With the method according to the invention, an element such as an air relief valve, which is open at low pressures, e.g., p=2 bar, ensures a slight leakage flow back to an open system, e.g., a tank. At higher pressures, the valve is closed and thus ensures normal operation of pump and resonator.

This results in a number of advantages. On the one hand, the system is continuously deaerated when the motor/pump unit is in stand-by mode. On the other hand, the lower volume flow through the steering gear decreases the system pressure and thus the energy consumption in stand-by operation. Leakage of only 0.5 l/min will provide savings of approximately 5 to 7%. Finally, the lower system pressure improves the reverse motion behavior of the steering gear.

Additional advantages and features of the invention will become apparent from the following description by means of the figures.

Figure 1:
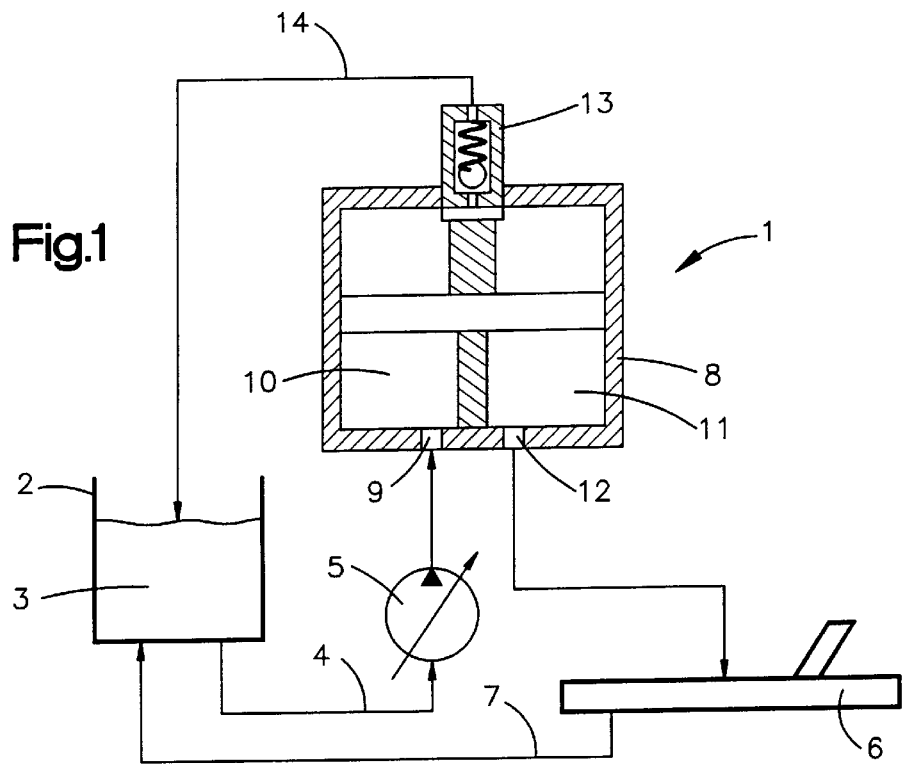
FIG. 1 is a schematic representation of a hydraulic control circuit according to an embodiment of the invention.

FIG. 1 shows a hydraulic system 1, in which a tank 2 receives hydraulic oil 3. Through a line 4 the oil 3 is supplied to a pump 5, whereby the oil quantity is delivered via a valve, which is not shown, to a steering gear. The oil is finally returned to tank 2 through a line 7.

In the embodiment shown, a resonator 8 is arranged between pump 5 and the steering gear 6. In resonator 8, the oil is supplied through bore 9. Resonator 8 has chambers 10, 11 such that the oil exits the resonator through bore 12. Resonator 8 serves to reduce pressure pulsations.

During or after filling of a pump with resonator, possibly also during operation due to cavitation, air development through chemical decomposition, leakage, or the like, air accumulates in the resonator lid. This effect is enhanced by the fact that the lid of the resonator is dome-shaped. The normal oil volume flow does not completely remove the accumulated air out of the resonator. The air remaining in the system foams up the oil being delivered. This deteriorates the noise behavior and may cause the lubricating film in the pump to tear off.

Through valve 13 disposed in the dome of resonator 8, any accumulated air may be returned to tank 2 via line 14 as a function of predetermined parameters. The operating parameters according to which valve 13 opens and closes may be freely determined. One suitable parameter is the hydraulic pressure. Valve 13 may be designed to remain open at low pressures. It may be provided, for example, that valve 13 ensures a leakage flow, e.g., Q=0.5 to 1 liter/minute, to tank 2 at low pressures, e.g., p=2 bar. At pressures >2 bar, valve 13 remains closed and thus ensures normal operation of pump 5 and resonator 8.

In modern pumps, which are known per se, the resonator is attached directly to the pump. In this case, a bore leads from the pump directly to the resonator. The hydraulic oil then passes through various chambers and reaches the wider circuit through an additional bore. In the embodiment shown, bore 9 is the inflow bore to resonator 8. The hydraulic oil passes through several chambers 10, 11 and exits the resonator through bore 12.

Figure 2:
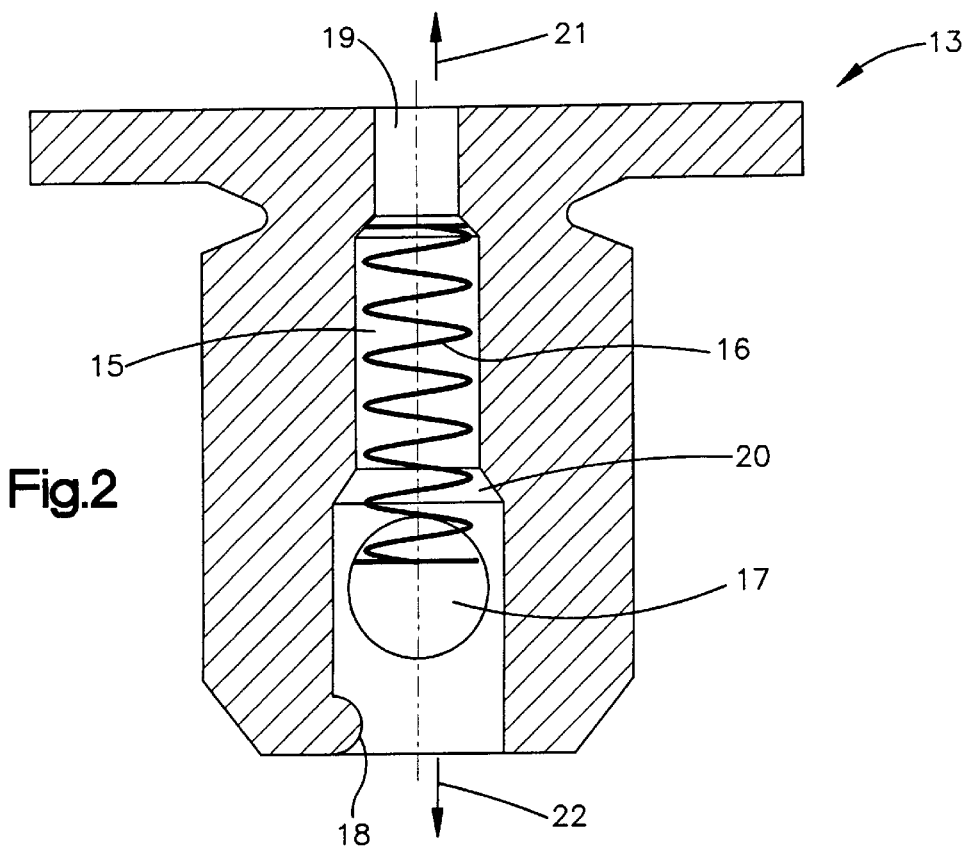
FIG. 2 is a sectional representation of an embodiment for a valve.

FIG. 2 shows an exemplary embodiment for a valve 13. Valve 13 has a through-hole in which a spring 16 is arranged in a spring space 15. In the embodiment shown, spring 16 is a helical spring pressing a ball 17 against a locking cam 18. Valve 13 thus remains open for feeding. Starting from a predetermined pressure, cam 18 pushes back ball 17 against the force of spring 16 to close it against sealing seat 20. The design of valve 13 is known per se. The air, which may be foamed up with oil or may have oil in it, exits the resonator through valve 13 and connection 19 to reach an open system, for example, tank 2.

List of Reference Numbers
1 hydraulic system
2 tank
3 hydraulic oil
4 line
5 pump
6 steering gear
7 line
8 resonator
9 bore
10 chamber
11 chamber
12 bore
13 valve
14 line
15 spring space
16 spring
17 ball
18 cam
19 connection
20 sealing seat
21 leakage flow
22 feed flow

What is claimed is:

1. A hydraulic power steering gear for turning steerable wheels of a vehicle, comprising:
   a reservoir for containing hydraulic fluid;
   a pump for pumping said fluid from said reservoir to said steering gear;
   a resonator located between said pump and said steering gear, said resonator having a chamber for receiving fluid from said pump, said chamber having a top area and an outlet for directing fluid to said steering gear; and
   a valve associated with said resonator, said valve having an open position permitting air to circulate from said top area of said chamber to said reservoir, said valve having a closed position blocking fluid flow through said valve to said reservoir during pressurizing of said chamber.

2. The hydraulic powered steering gear of claim 1, wherein said valve comprises a valve member biased to an open position and movable to a closed position by pressure in said chamber.

* * * * *